United States Patent [19]

Charles

[11] Patent Number: 4,979,584
[45] Date of Patent: Dec. 25, 1990

[54] AUTOMOTIVE VEHICLE ENGINE BAY VENTILATION

[75] Inventor: Herbert N. Charles, Chatham, Canada

[73] Assignee: Siemens-Bendix Automotive Electronics Limited, Chatham, Canada

[21] Appl. No.: 357,509

[22] Filed: May 25, 1989

[51] Int. Cl.$^5$ .............................................. B60K 11/00
[52] U.S. Cl. ................................... 180/68.1; 140/68.4
[58] Field of Search .................... 180/68.1, 68.2, 68.3, 180/68.4

[56] References Cited

U.S. PATENT DOCUMENTS 3,696,730 10/1972 Masuda et al. ...................... 180/68.1
4,082,344 4/1978 Anderson ............................... 296/28
4,114,714 9/1978 Fachbach et al. .................. 180/68.1

FOREIGN PATENT DOCUMENTS 2632166 2/1977 Fed. Rep. of Germany.
1528044 10/1978 United Kingdom.
1555466 11/1979 United Kingdom.

Primary Examiner—Charles A. Marmor
Assistant Examiner—Richard Comby
Attorney, Agent, or Firm—George L. Boller; Russel C. Wells

[57] ABSTRACT

Ram air ventilation of the engine bay of an automotive vehicle is accomplished by providing ventilating openings in a transverse structural cross-member that bridges the front of the engine bay, and by collecting hot effluent from the radiator and condenser and directing same out of the engine bay.

8 Claims, 4 Drawing Sheets

AUTOMOTIVE VEHICLE ENGINE BAY VENTILATION

BACKGROUND AND SUMMARY OF THE INVENTION

This invention relates to the ventilation of the engine bay of an automotive vehicle.

Most automobiles have the engine bay located at the front of the vehicle. Typically an internal structural cross-member bridges the front of the bay and supports the radiator that is a part of the engine's cooling system. When the vehicle is equipped with air conditioning, the condenser mounts in front of the radiator. The radiator and condenser are cooled by air that passes through them, the air either being forced through the radiator and condenser by ram air effect when the vehicle is in forward motion, and/or by being drawn through the radiator and condenser by a fan or fans located directly behind the radiator and condenser. As a result, the engine bay is ventilated by air that has been heated by the radiator and condenser. Before this air leaves the engine bay, it is further heated by the heat emitted directly by the engine. Consequently elevated temperatures can occur in the engine bay and at other locations that are exposed to the heated air leaving the engine bay. These elevated temperatures may be sufficiently high to create thermally induced problems in certain areas or components of an automotive vehicle.

The present invention relates to a new and unique arrangement for ventilating an engine bay to reduce temperatures. The invention involves the use of a ducted fan or fans to draw cooling air through the radiator and condenser and to convey the drawn air out of the engine bay so that hot effluent from the radiator and condenser does not ventilate the engine bay. The invention further involves the radiator and condenser mounting on an internal structural cross-member that bridges the front of the engine bay but with the radiator and condenser covering only a limited portion of the total open area of the cross-member. The remainder of the open area of the internal structural cross-member remains open so that ram air passes through this remaining open area to ventilate the engine bay.

While the use of ducted fans in association with the radiator of a motor vehicle is not broadly new, as evidenced by U.S. Pat. No. 4,082,344 and German OS No. 26 32 166, the prior art usage is for heating the engine bay. Moreover, the prior art does not integrate the ventilation system with an internal structural cross-member of the vehicle in the manner contemplated by the present invention. Accordingly, the invention is believed to constitute a significant development for reducing temperatures in the engine bay and at locations that are exposed to air that has ventilated the engine bay.

The foregoing features, advantages and benefits of the invention, along with additional ones, will appear in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
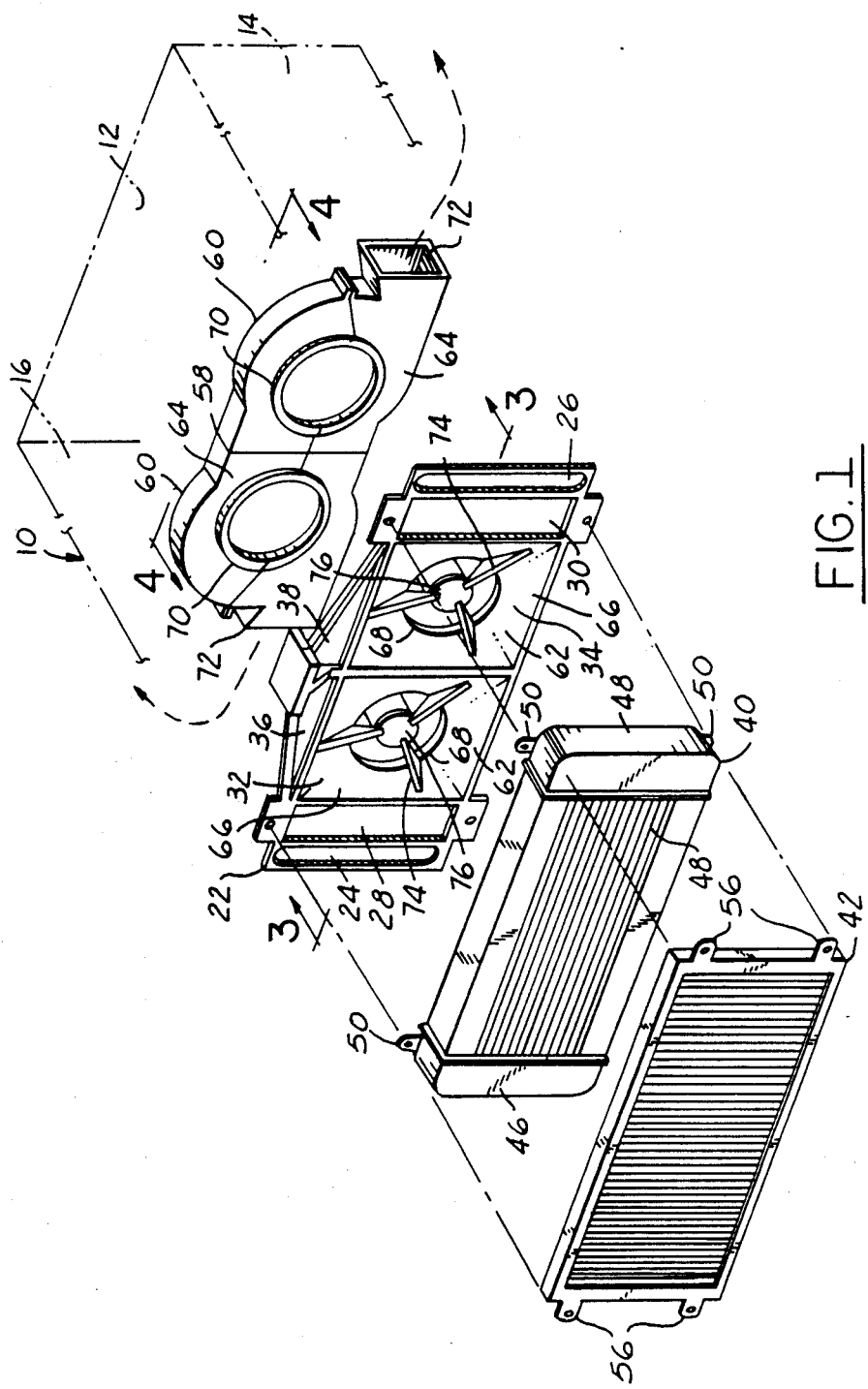
FIG. 1 is an exploded perspective view of a representative installation in accordance with principles of the invention.
Figure 2:
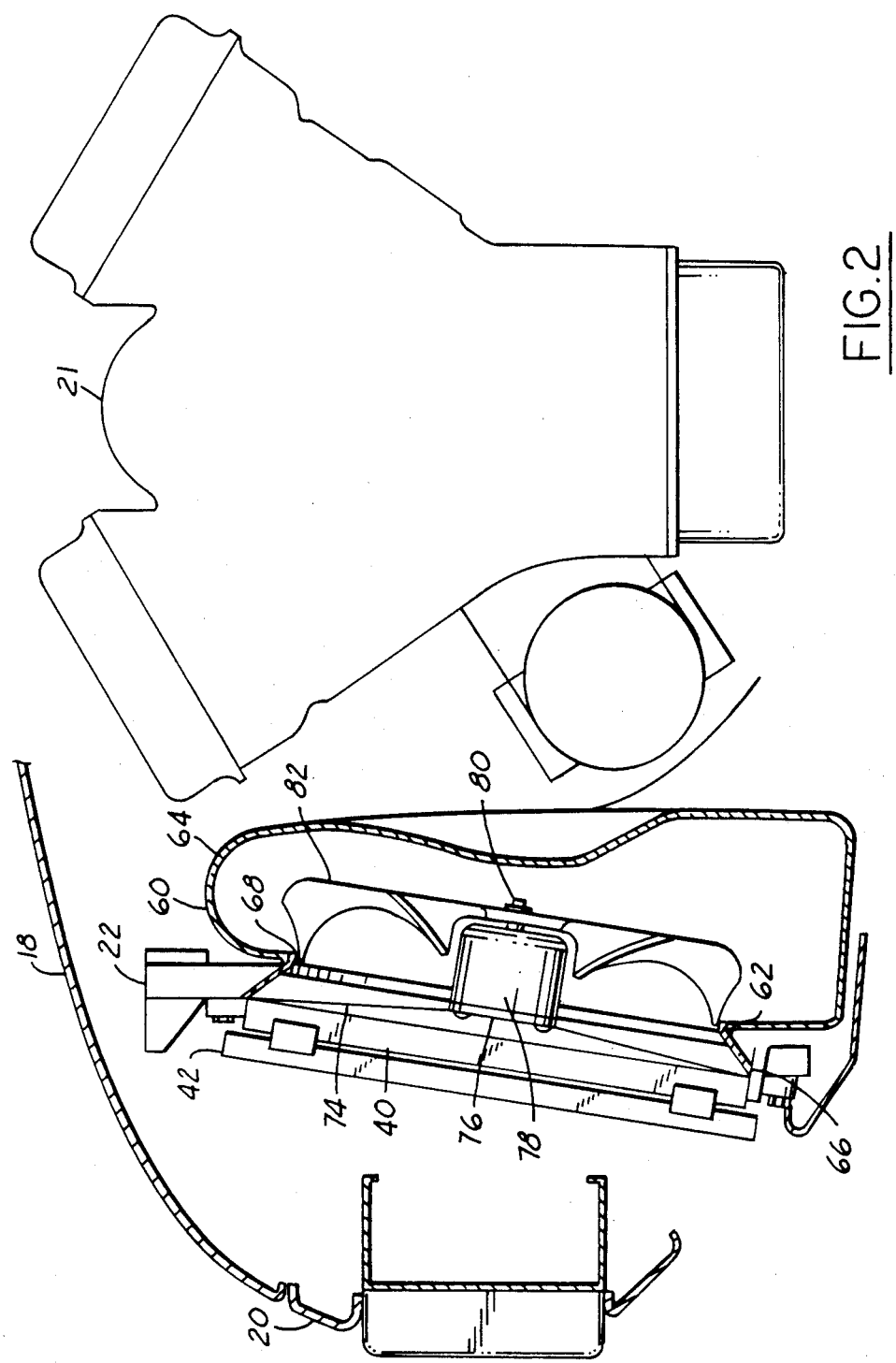
FIG. 2 is a side elevational view, on an enlarged scale and partly cross-section, of FIG. 1 showing the several parts in assembled relation.
Figure 3:
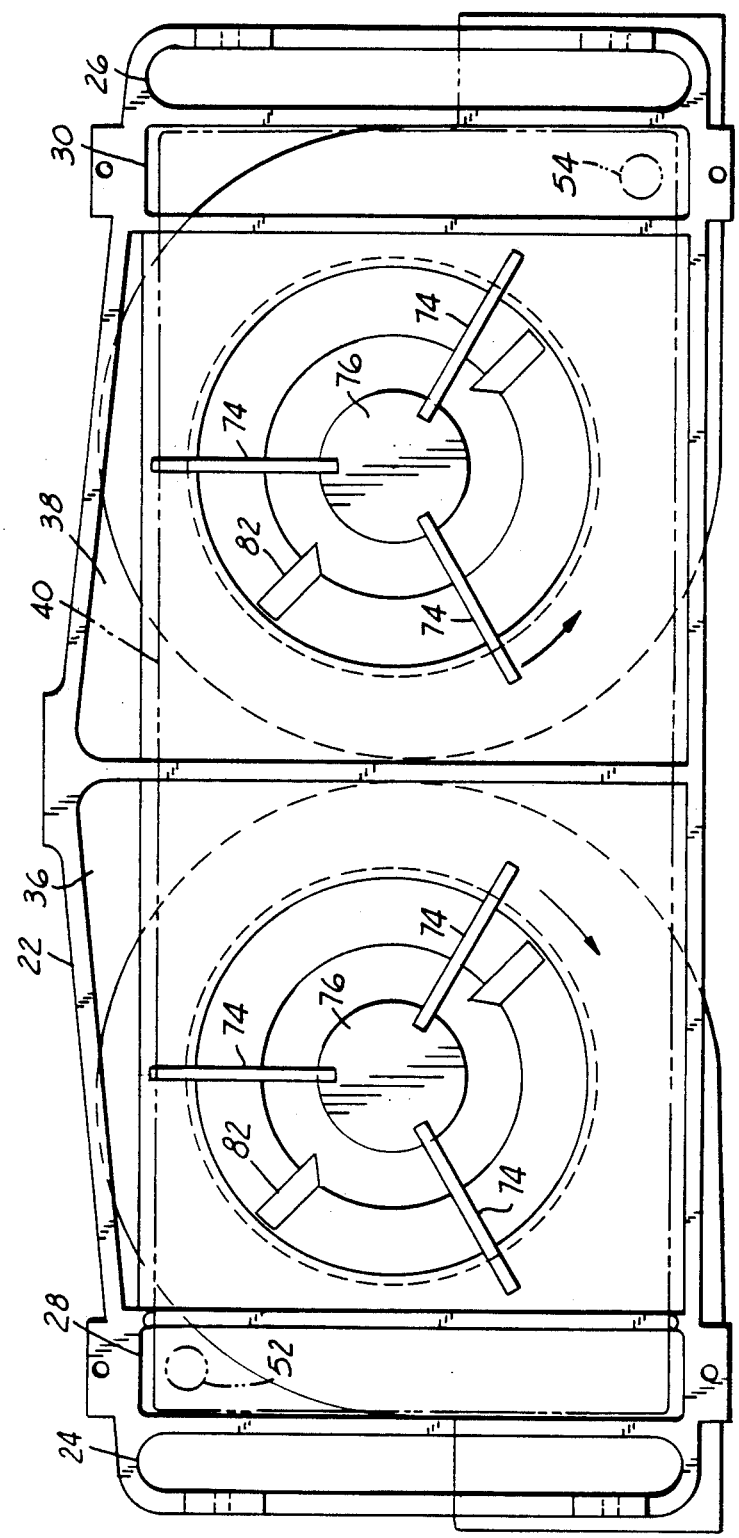
FIG. 3 is an enlarged view taken in the direction of arrows 3—3 in FIG. 1.
Figure 4:
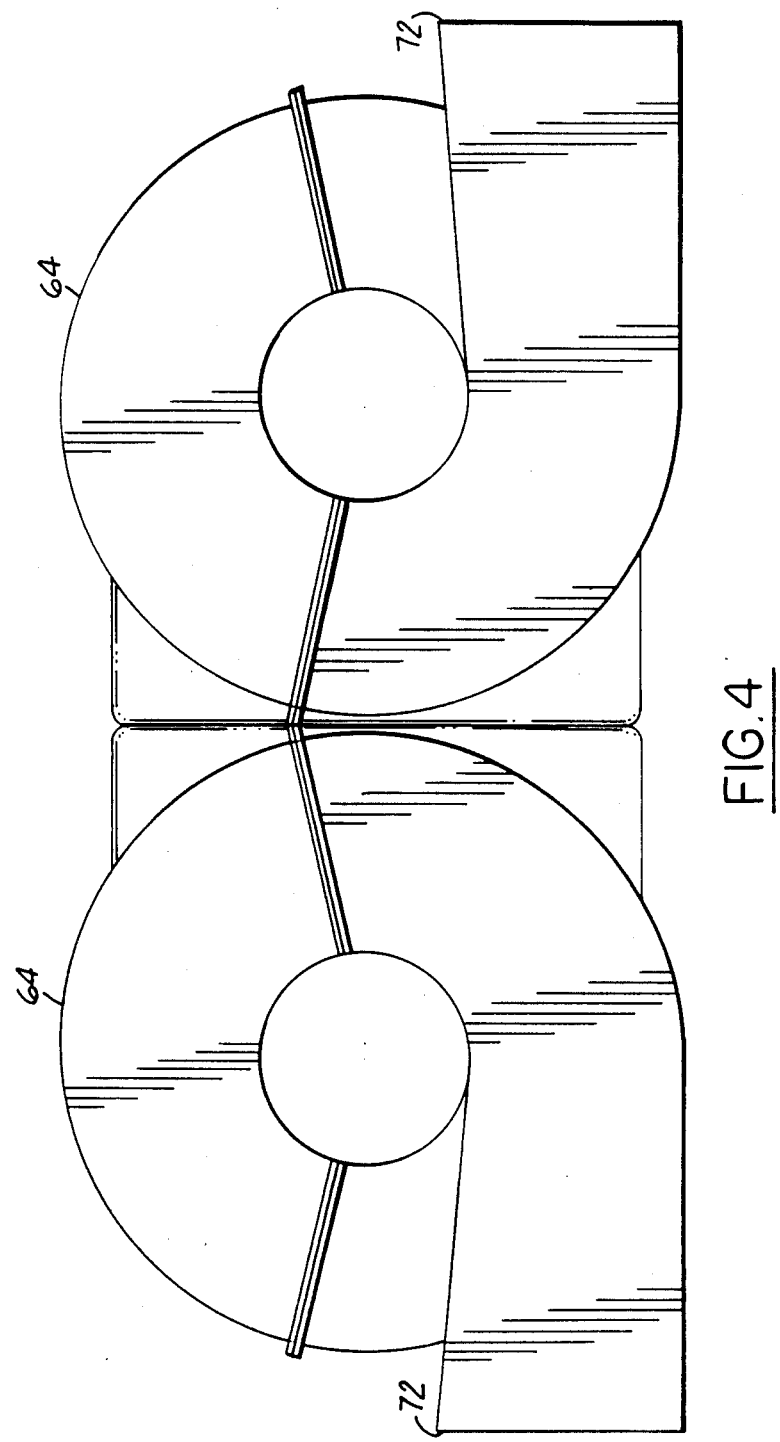
FIG. 4 is an enlarged view taken in the direction of arrows 4—4 in FIG. 1.

The drawing figures show a representative configuration for an automotive vehicle engine bay ventilation according to the invention. The engine bay is represented by the numeral 10 and is schematically portrayed in FIG. 1. The engine bay is bounded at the rear by a dash panel 12 and at the sides by inner fenders 14 and 16 and these are also schematically portrayed. A portion of the hood 18 is shown in FIG. 2, as is the front end 20 of the vehicle. Inside the front end 20 and forwardly of the transversely mounted engine 21 is a transverse structural cross-member 22 that joins the inner fenders 14 and 16 across the front of the bay. Cross-member 22 has an open area comprising a number of openings 24, 26, 28, 30, 32, 34, 36, 38 that pass through the cross-member from front to rear. Heat exchanger structure is disposed in front of and mounted on the structural cross-member. This heat exchanger structure comprises a radiator 40 for engine 21, and when the vehicle has air conditioning, it further comprises a condenser 42. Radiator 40 has end tanks 44, 46 at the sides and a core 48 extending between said sides. The radiator attaches to cross-member 22 at points of attachment 50. Tubes 52 and 54 project rearwardly from the end tanks 44, 46 to provide for connection to hoses leading to and from the engine. The condenser attaches to the radiator at points of attachment 56. In the assembled condition, the radiator end tanks 46, 48 fit to the vertically elongated openings 28, 30 so that the tubes 52, 54 can project rearwardly through the respective openings.

Ducted fan structure, 58 generally, comprising two ducted fans 60 is cooperatively associated with the structural cross-member 22, radiator 40 and condenser 42. Each ducted fan comprises an inlet cone 62 and a scroll 64. The ducted fans are disposed directly behind the core areas of the radiator and condenser. Each cone 62 has an inlet opening 66 that matches the corresponding openings 32 and 34 of structural cross-member 22. Furthermore, each cone has a circular outlet opening 68 that is generally centrally located with respect to the inlet opening 66. Each scroll 64 comprises a circular inlet opening 70 that fits to the circular outlet opening 68 of the corresponding inlet cone. Furthermore, each scroll has an outlet opening 72 that is disposed to the side. Each inlet cone further contains a set of three struts 74 that support a motor mount 76 centrally of each outlet opening 68. An electric motor 78 is fitted to each mount and projects rearwardly to fit inside the corresponding scroll when the parts are assembled. The motor shaft 80 points to the rear and a fan 82 is disposed within the corresponding scroll and attached to shaft 80. With this arrangement the ducted fan structure is disposed on the engine bay side of the heat exchange structure and encloses the engine bay side of the heat exchange structure.

Whenever the fans 82 are operated by energizing the motors 78, they are effective to draw air through the core areas of the condenser 42 and radiator 40 so that the air passes through the inlet cones 62 and through scrolls 64 to be discharged at the scroll outlets 72. The scroll outlets 72 convey the hot effluent out of the engine bay by the outlets either passing through the inner fender walls 14 and 16 directly or else by connecting to ducts (not shown) which exit the engine bay. When the vehicle is in forward motion, ram air is forced through the condenser, the radiator and the ducted fans to be discharged via the outlets 72 if the fans are not operating. At the same time ram air is forced through the vertically elongated openings 24, 26, and the horizontally elongated openings 36 and 38 to ventilate the engine bay. The air that passes through these openings 24, 26, 36 and 38 is not heated by the condenser or radiator, and therefore the engine bay is ventilated with ambient air, not with effluent from the condenser and radiator.

It is contemplated that the structural cross-member 22 can be fabricated by any of several conventional techniques. For example it could be a stamped metal part or it could be a moulded structural plastic part. It is also possible that the inlet cones 62 could be integrally formed with the structural cross-member. The struts 74 and motor mount 76 can also be integrally formed with the inlet cone.

Scrolls 64 are fabricated to have an upper part 84 that can be disassembled from a lower part 86. This can provide access to the fans and motors if service is necessary.

The electric motor 78 and fans 82 are conventional and the scrolls 64 are constructed in accordance with conventional fabrication techniques. The ducted fans are preferably of a type that is commonly known as a mixed flow fan.

While a preferred embodiment of the invention has been disclosed, it will be appreciated that principles are applicable to other embodiments.

What is claimed is:

1. In an automotive vehicle which has an engine bay located at the front of the vehicle, an internal structural cross-member bridging the front of the engine bay, said cross-member having an open area, heat exchange structure mounted on said cross-member and disposed in a limited portion of said open area, ducted fan structure disposed on the engine bay side of said heat exchange structure and enclosing the engine bay side of said heat exchange structure for drawing air through said heat exchange structure and conveying the effluent to a location outside the engine bar, the remainder of said open area of said cross-member remaining open to pass ram air into the engine bay so that the engine bay is ventilated by ram air and not by effluent from the heat exchange structure, said cross-member being a structural plastic and the ducted fan structure comprising inlet cone structure, said inlet cone structure being an integral part of said cross-member, motor mount structure integral with said cross-member for supporting electric motor means centrally of said inlet cone structure, said electric motor means operating said ducted fan structure, said motor means having a shaft means that points toward the engine bay and the ducted fan structure comprising fan means mounted on said shaft means.

2. In an automotive vehicle which has an engine bay located at the front of the vehicle, an internal structural cross-member bridging the front of the engine bay, said cross-member having an open area, heat exchange structure mounted on said cross member and disposed in a limited portion of said open area, ducted fan structure disposed on the engine bay side of said heat exchange structure and enclosing the engine bay side of said heat exchange structure for drawing air through said heat exchange structure and conveying the effluent to a location outside the engine bay, the remainder of said open area of said cross-member remaining open to pass ram air into the engine bay so that the engine bay is ventilated by ram air and not by effluent from the heat exchange structure, said limited portion of said open area being located centrally in said cross-member, the remainder of said open area being laterally and vertically outboard of said limited portion of said open area, said heat exchange structure comprising a core and end tanks, said core and end tanks occupying said limited portion of said open area, said limited portion of said open area comprising vertically elongated openings in which said end tanks are disposed, comprising vertically elongated openings laterally outboard of said limited portion of said open area and horizontally elongated openings vertically above said limited portion of said open area.

3. In an automotive vehicle which has an engine bay located at the front of the vehicle, an internal structural cross-member bridging the front of the engine bay, said cross-member having an open area, heat exchange structure mounted on said cross-member and disposed in a limited portion of said open area, ducted fan structure disposed on the engine bay side of said heat exchange structure and enclosing the engine bay side of said heat exchange structure for drawing air through said heat exchange structure and conveying the effluent to a location outside the engine bay, the remainder of said open area of said cross-member remaining open to pass ram air into the engine bay so that the engine bay is ventilated by ram air and not by effluent from the heat exchange structure, the ducted fan structure comprising an inlet cone that enclosed the engine bay side of said heat exchange structure and axially extends from the heat exchange structure toward the engine bay to terminate in a generally circular outlet that faces the engine bay, motor mount structure that is disposed centrally of said inlet cone and mounts an electric motor means centrally of said inlet cone structure such that a shaft means of said electric motor means points toward the engine bay, and fan means mounted on said shaft means for operation by said electric motor means, said ducted fan structure further comprising a housing having an inlet fitting to the circular outlet of said inlet cone structure and enclosing said fan means, said housing having an exit that conveys the effluent out of the engine bay, said housing comprising plural parts cooperatively fitting the housing inlet to the outlet of said inlet cone structure, at least one of said parts being a top part that is removable to provide access to said fan means and said electric motor means.

4. In an automotive vehicle which has an engine bay located at the front of the vehicle, an internal structural cross-member bridging the front of the engine bay, said cross-member having an open area, heat exchange structure mounted on said cross-member and disposed in a limited portion of said open area, ducted fan structure disposed on the engine bay side of said heat exchange structure and enclosing the engine bay side of said heat exchange structure for drawing air through said heat exchange structure and conveying the effluent to a location outside the engine bay, the remainder of said open area of said cross-member remaining open to pass ram air into the engine bay so that the engine bay is ventilated by ram air and not by effluent from the heat exchange structure, said limited portion of said open area being located centrally in said cross-member, the remainder of said open area being laterally and vertically outboard of said limited portion of said open area, said remainder of said open area comprising vertically elongated openings laterally outboard of said limited portion of said open area and at least one horizontally elongated opening vertically above said limited portion of said open area.

5. In an automotive vehicle which has an engine bay comprising a structural cross-member disposed laterally in the vehicle to bridge the engine bay, said cross-member having a vertical and horizontal expanse that bounds the perimeter of an open area of the cross-member, heat exchange structure mounted on said cross-member in covering relation to said open area, ducted fan structure disposed on the engine bay side of said heat exchange structure and enclosing the engine bay side of said heat exchange structure for drawing air through said heat exchange structure and conveying the effluent to an outlet of said ducted fan structure, said cross-member being a structural plastic and the ducted fan structure comprising an inlet cone structure and a scroll, said inlet cone structure being an integral part of said cross-member, said inlet cone structure terminating at said scroll which is closed at the rear and has said outlet of said ducted fan structure at a side thereof, motor mount structure integral with said cross-member supporting centrally of said inlet cone structure an electric motor means for operating said ducted fan structure, said electric motor means having a shaft means that points toward the engine bay and the ducted fan structure comprising fan means mounted on said shaft means.

6. The combination claimed in claim 5 wherein said ducted fan structure comprises a housing having an inlet fitting an outlet of said inlet cone structure and enclosing said fan means, said housing comprising plural parts cooperatively fitting the housing inlet to the outlet of said inlet cone structure, at least one of said parts being a top part that is removable to provide access to said fan means and said electric motor means.

7. For use in an automotive vehicle which has an engine bay located at the front of the vehicle, an internal structural cross-member bridging the front of the engine bay, said cross-member having an open area that is adapted to receive heat exchange structure disposed in a limited portion of said open area and ducted fan structure disposed on the engine bay side of said heat exchange structure for enclosing the engine bay side of said heat exchange structure to draw air through said heat exchange structure and convey the effluent to a location outside the engine bay, the remainder of said open area of said cross-member remaining open for passing ram air into the engine bay so that the engine bay will be ventilated by ram air and not by effluent from the heat exchange structure, said limited portion of said open area being located centrally in said cross-member, the remainder of said open area being laterally and vertically outboard of said limited portion of said open area, said remainder of said open area comprising vertically elongated openings laterally outboard of said limited portion of said open area and horizontally elongated openings vertically above said limited portion of said open area.

8. In an automotive vehicle which has an engine bay, a unitary, one-piece plastic structural cross-member mounted laterally in the vehicle to bridge the engine bay, said cross-member having a vertical and horizontal expanse of plastic that bounds the perimeter of an open frontal area of the cross-member that mounts a heat exchange structure in covering relation to said open frontal area, the perimeter of said open frontal area being closed, and also ducted fan structure on the engine bay side of the heat exchange structure enclosing the engine bay side of the heat exchange structure to draw air through said heat exchange structure and convey the effluent to an outlet of the ducted fan structure, the ducted fan structure comprising an inlet cone structure and a scroll, said inlet cone structure extending rearwardly from said open frontal area and terminating in an opening which is spaced rearwardly of said open frontal area of the cross-member, said opening is disposed in said scroll which is closed at the rear and has said outlet of said ducted fan structure at a side thereof, said inlet cone structure being an integral part of said cross-member, and electric motor mount structure integral with said cross-member mounting an electric motor and fan means centrally of said inlet cone structure.

* * * * *